Jan. 6, 1925.
F. E. M. SCHENK
1,522,469
SELF LOCKING SPUR GEAR TRAIN
Filed Aug. 17, 1923
2 Sheets-Sheet 1
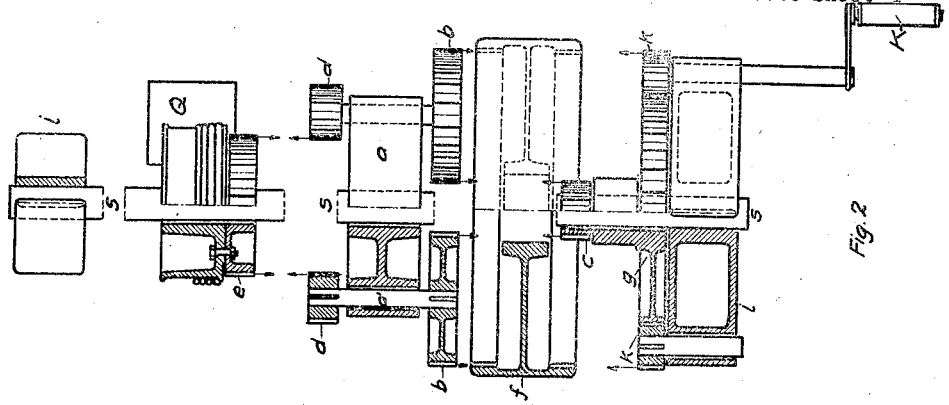
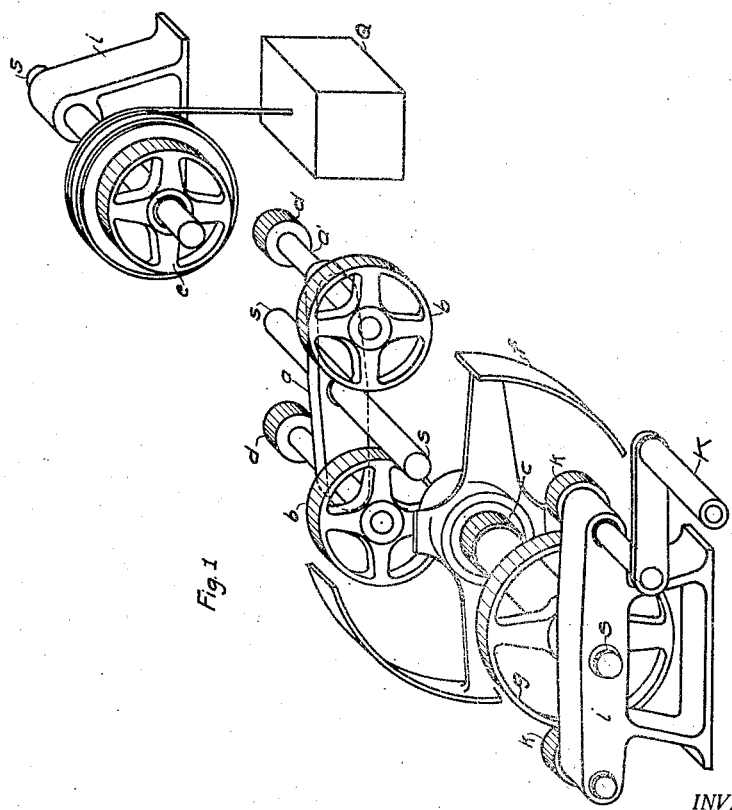
INVENTOR.
Franz Emil Max Schenk.
BY
F. W. Buse
ATTORNEY.

Jan. 6, 1925.　　　　　F. E. M. SCHENK　　　　　1,522,469
SELF LOCKING SPUR GEAR TRAIN
Filed Aug. 17, 1923　　　2 Sheets-Sheet 2

INVENTOR.
Franz Emil Max Schenk.
BY
J. W. Buse
ATTORNEY.

Patented Jan. 6, 1925.

1,522,469

UNITED STATES PATENT OFFICE.

FRANZ EMIL MAX SCHENK, OF ALTONA, GERMANY, ASSIGNOR TO F. W. BUSE, OF DORMONT, PENNSYLVANIA.

SELF-LOCKING SPUR-GEAR TRAIN.

Application filed August 17, 1923. Serial No. 657,956.

*To all whom it may concern:*

Be it known that I, FRANZ EMIL MAX SCHENK, a citizen of Germany, and a resident of Altona, Germany, have invented certain new and useful Improvements in Self-Locking Spur-Gear Trains, of which the following is a specification.

The invention relates to a spur gear drive mechanism for hoisting and pulling or pushing devices such as hoists, blocks, winches, capstans, etc.; and it has for its object mechanism of this character in which an automatic locking of the drive under load may be attained without sacrificing the efficiency of the gearing. A further object consists in the elimination of all brake or like devices; and to a construction which will allow of the use of speed changing expedients, as gearing or clutches, on the driving side of the mechanism, regardless of whether the load is active on the driven side or during the operation of such expedients.

Heretofore, hoisting devices of this character have attained this self-locking or automatic feature thru the utilization of the friction between the teeth of particularly arranged gears, or by means of constructions embodying specially proportioned shaft diameters, etc. In all instances, however, the great loss in efficiency due to the friction involved in the use of such expedients, necessitated, where a high factor of efficiency was required, the return, in one form or another, to the use of a brake.

The problem, however, is most satisfactorily met by balancing tooth load moments, as in the particular arrangement of gearing hereinafter described, and shown in the accompanying drawings, in which—

Fig. 1 shows in perspective, and Fig. 2 in half section, the gearing arrangement in disassembled relationship.

Figure 5:
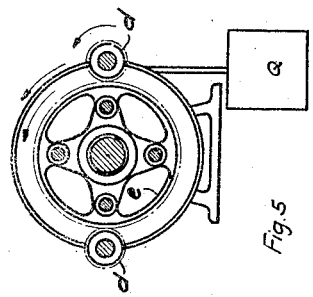
Figure 6:
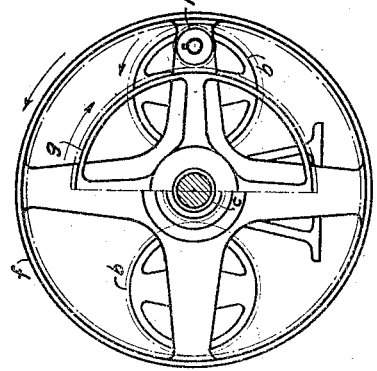
Figure 3:
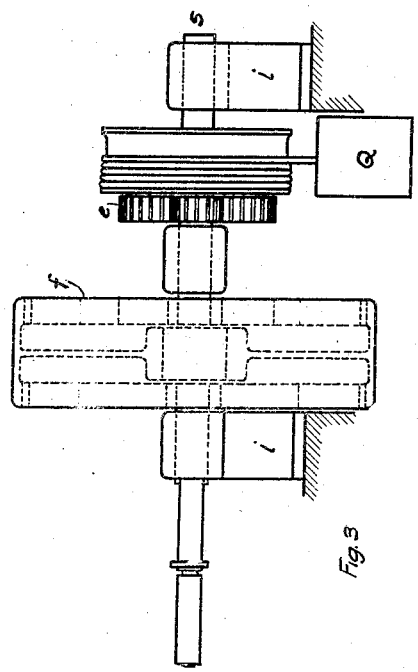
Fig. 3 shows the mechanism in elevation, with portions omitted.
Figure 4:
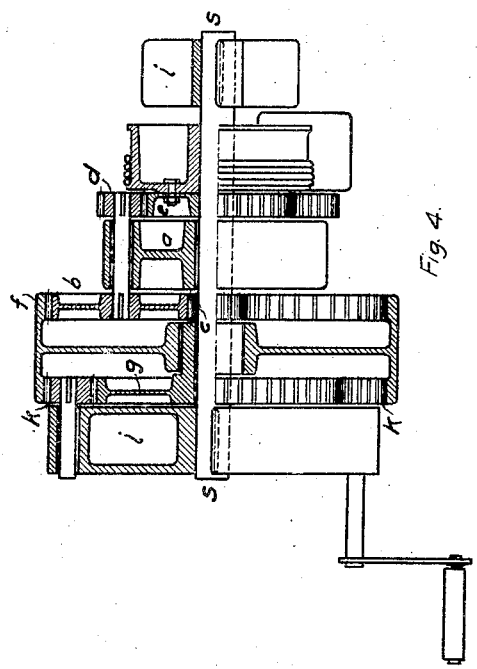
Fig. 4 is a horizontal section thru the mechanism.

Figs. 5 and 6 are sectional views taken respectively on the lines 1—1 and 2—2, Fig. 4.

Referring to the drawings, the invention is shown as comprising a stationary frame $i$ in which the mechanism is suitably mounted, said frame supporting an axle $s$ about which the various gear trains may operate. It will be understood, of course, that this axle may be employed as a driving shaft when desired; and the invention contemplates also the association with the novel drive mechanism or speed changing mechanism (not shown) of any well-known or special design in advance of the driving gearing of said drive mechanism. The aforesaid driving gearing consists of a train composed of the spur gear $g$ which is rotatably mounted on the axle $s$ and meshes with one or more pinions, preferably a pair of pinions $k$ diametrically disposed about the gear $g$ and rotatably mounted in the frame $i$; also, an internal gear $f$ concentric with the gear $g$ and meshing with said pinions $k$. The gears $g$ and $f$ thus have equal peripheral velocities, but their rotation is in opposite directions. In the particular embodiment illustrated, the drive is effected through one of the pinions $k$ as by means of a crank or handle K connected with its shaft, although any gear of the train may be arranged to serve as the motion initiating member or driver; and, also, any type of prime mover may be employed to effect the drive.

About the axle $s$ is also mounted for rotation thereon the load drum or like member for a load Q (either as a push or pull) and having a load gear $e$ which may be either of the internal type or a plain spur gear as shown, or any other suitable means of reduction.

Between the aforesaid driving train and the said load gear $e$ is arranged a double planetary drive composed of a gear $c$, loosely mounted on the shaft $s$ coaxially with the gear $g$ and rotating therewith, and preferably a pair of diametrically disposed gears $b$ meshing therewith and mounted on and rotatable with corresponding shafts mounted in a yoke $a$ rotatable on the axle $s$. The said shafts are provided at their opposite ends also with pinions $d$, which are rotatable therewith and designed to mesh with the teeth of the load gear $e$. The two pairs of wheels $b$ and $d$ are of different diameters or peripheral velocities; but it is immaterial which of the pairs is to engage the internal gear $f$. As shown, the teeth of the oppositely disposed wheels $b$ are designed to mesh with the teeth of an internal gear wheel which, in the embodiment shown, are common and integral with the teeth of the wheel $f$ driven from the wheel $g$, the wheel $f$ being a twin gear. It is to be understood, however, that the internal gear wheel $f$ may be in two distinct and separate parts, which may also be of different diameters according to the design desired. The gears c and f, however, have unequal peripheral velocities and their rotation is in opposite directions. Furthermore, it will be understood that the invention contemplates the separation of the axle s with suitable mounting for each portion; and, also, an external support of the gearing rather than by means of the said axle.

In operation, reference being had more particularly to Fig. 1 of the drawings, it will be appreciated, when the load is lifted by means of turning the crank K, that the gear k rotates in the direction of the arrow, or counter-clockwise. The two gears g and f² thereupon rotate with the same circumferential velocities but in opposite directions, the gear g rotating clockwise while the gear f rotates counter-clockwise. Since the gear c is rigidly connected with gear g, it also rotates clockwise, while the planet gear b meshing therewith rotates in the same direction as the gear k (counter-clockwise) but with a lesser circumferential velocity in the ratio of the diameters of the respective gears c and g.

The internal gear f, which is indicated as a twin gear of two equal diameters and meshing with both the pinions k and the planet gears b, rotates in a direction opposite to the gear c and with a much higher circumferential velocity. The gear b will, therefore, roll about gear c; or, in other words the axis of gear b revolves about the axle s thereof in the same direction as gear f, namely, counter-clockwise. Since the gear d, which is rigidly connected with the gear b meshes with the load gear e, the latter is rotated with the velocity of the planet gear axle less the velocity of the gear d, the load gear e rotating in the same direction as the gear f and the yoke a, namely counter-clockwise.

When the power applied thru crank K ceases to act, the tooth load on load gear e attempts to move the planet gear axle about axle s in a direction opposite to the direction of rotation prevailing during the lifting of the load (clockwise), and at the same time tends to rotate the planet gears d and b about their own axes and in the same direction as prevails during the lifting of the load (counter-clockwise).

The force attempting to revolve the planet gear axle about the axle s is then tending to rotate the gears c and f as well as the gears g and f in the same direction (clockwise); but such a movement thereof is prevented by the action of the gear k thru its rigid support.

Assuming that the planet gear shaft is maintained in its particular position in space, the force attempting a rotation of the planet gear b might either rotate the gears c and f with equal circumferential speed, but in opposite directions; or, in the case of a rotation in the opposite direction to the one prevailing during lifting of the load, it might attempt, while rolling off on gear f to rotate the gear c with a greater circumferential speed than the one possessed by the gear f. Both of these eventualities assume that the gears f and g could rotate with different circumferential speeds which, however, is not possible because of the gear k meshing with both of the aforesaid gears.

Since a rolling motion between the gears g and c, such as would occur during the lifting of the load, is prevented in the opposite direction thru the action of the load itself, there is no possibility of any motion occurring, in other words, the drive is self-locking.

I claim—

1. Self-locking spur gear mechanism of the character described comprising a frame and a supporting axle mounted therein, a load gear rotatably mounted in the frame, a pair of connected external gears of different diameters rotatably mounted on said axle, a pair of connected internal gears concentrically and rotatably mounted about said external gears, means for driving said pairs of gears in opposite directions, and intermediate gearing revolvable about said axle and meshing with said load gear and with one gear of each of the said pairs of gears, the said intermediate gearing including a pair of rotatably mounted planet pinions.

2. Self-locking spur gear mechanism of the character described comprising a frame and a supporting axle mounted therein, a pair of connected external gears of different diameters rotatably mounted on said axle, a pair of connected internal gears concentrically and rotatably mounted about said external gears; means for driving said pairs of gears in opposite directions, a yoke mounted on said axle, a load gear also mounted on said axle adjacent said yoke, and a pair of planet pinions rotatably mounted in said yoke, one of said pinions meshing with said load gear and the other meshing with one gear of each of the said pairs of gears.

3. Self-locking spur gear mechanism of the character described comprising a frame and a supporting axle mounted therein, a load gear rotatably mounted in the frame, a pair of connected external gears of different diameters rotatably mounted on said axle, a pair of connected internal gears concentrically and rotatably mounted about said external gears; means for driving said pairs of gears in opposite directions, a yoke rotatably mounted about the axle, a pair of diametrically disposed shafts carried thereby, and a pair of gears of unequal diameters mounted to rotate with each of said yoke shafts, corresponding gears of a pair meshing with the load gear, and with one gear of each of the said pairs of gears.

4. Self-locking spur gear mechanism of the character described, comprising a frame and an axle mounted therein, a gear rotatably mounted about the axle, a driving pinion rotatable in the frame and meshing with said gear, means to rotate said pinion, a further pinion rotatable in the frame and meshing with the rotatably mounted gear and diametrically disposed with respect to the said first-named pinion, a gear co-axial with the rotatably mounted gear and running therewith, and an internal gear concentrically mounted about the first-named gear of said co-axially mounted gears and meshing with said diametrically disposed pinions, an internal gear concentrically mounted about the second-named gear of said co-axial gears; a load gear; a yoke rotatably mounted about the axle, a pair of diametrically disposed shafts carried by the yoke, and a pair of gears of unequal diameters mounted to rotate with each of said yoke shafts, corresponding gears of each pair meshing respectively with the load gear, and with the said second-named internal gear and the second-named gear of the co-axial gears.

In testimony whereof I affix my signature in presence of two witnesses.

FRANZ EMIL MAX SCHENK.

Witnesses:
A. RASPAUCH,
M. BLÜNCK.